April 14, 1964  E. G. PICKELS ETAL  3,129,174
CONTINUOUS FLOW TYPE CENTRIFUGE AND FLUID
TEMPERATURE CONTROL THEREFOR
Filed Sept. 30, 1960  3 Sheets-Sheet 1

EDWARD G. PICKELS
RICHARD C. STALLMAN
INVENTORS

BY *Flehr and Swain*
ATTORNEY

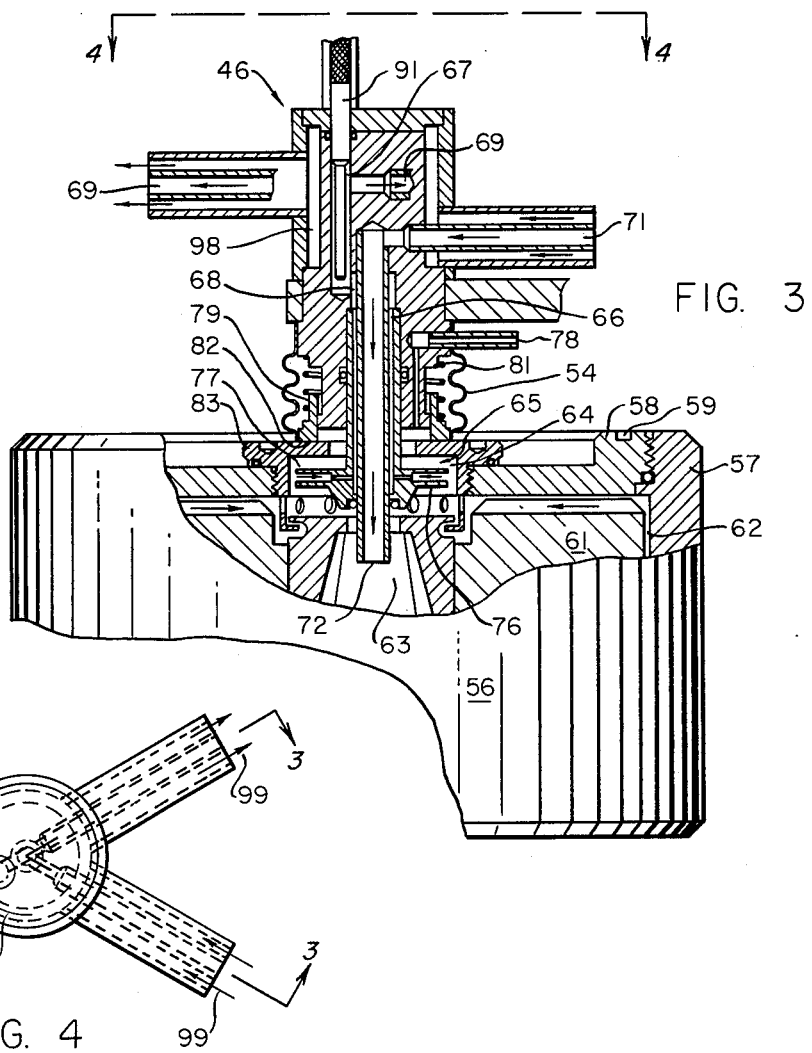
FIG. 3
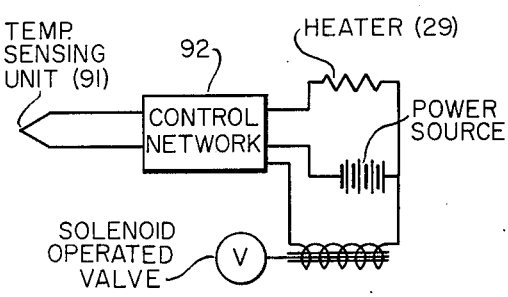
FIG. 4
FIG. 5
EDWARD G. PICKELS
RICHARD C. STALLMAN
INVENTORS
BY Flehr and Swain
ATTORNEY April 14, 1964 E. G. PICKELS ETAL 3,129,174
CONTINUOUS FLOW TYPE CENTRIFUGE AND FLUID
TEMPERATURE CONTROL THEREFOR
Filed Sept. 30, 1960 3 Sheets-Sheet 3

EDWARD G. PICKELS
RICHARD C. STALLMAN
INVENTOR

BY *Flehr and Swain*
ATTORNEY

United States Patent Office 3,129,174
Patented Apr. 14, 1964

3,129,174
CONTINUOUS FLOW TYPE CENTRIFUGE AND FLUID TEMPERATURE CONTROL THEREFOR
Edward G. Pickels, Atherton, and Richard C. Stallman, San Carlos, Calif., assignors to Beckman Instruments, Inc., a corporation of California
Filed Sept. 30, 1960, Ser. No. 59,530
5 Claims. (Cl. 233—11)

This invention relates generally to the temperature control of fluid being fed to, processed, and removed from continuous flow type centrifuge apparatus.

In many instances where materials are separated by centrifugation, particularly in continuous flow processes, it is desirable to maintain the temperature of the fluid sample being processed at or near some specific temperature, both as it is conveyed to the rotor and as it is processed therein. Examples of separations where temperature control is important are alcohol precipitation of proteins, separation of materials near their freezing temperature, and separation of materials such as biological materials which are deactivated above certain temperatures. Further, it may be that the physical characteristics of the solution change with changes in temperatures. For example, a solution may have a mixture of components some of which are soluble at a given temperature and others which are insoluble at the temperature.

Temperature control of fluid and rotor temperatures in prior art continuous centrifuge apparatus has been relatively ineffective. Control of temperature has been attempted by employing insulated jackets on the fluid feed and removal lines, by insulating the rotor and by controlling the chamber temperature in response to signals indicative of chamber or rotor temperature. Generally, in continuous flow centrifugation, the fluid flow rates are relatively slow. The temperature control system is required to maintain constant temperature over relatively long periods of time.

In the prior art attempts have been made to control the temperature of the rotor by maintaining the chamber temperature fixed at some level, which level is determined by trial and error. However, if the speed of the rotor is varied, the heat generated by the friction between the rotor and enveloping air changes, and consequently the temperature of the rotor varies at different speeds. The temperature of the fluid varies to a lesser extent because of the mechanical action on the same during centrifuging.

It is, therefore, an object of the present invention to provide a centrifuge apparatus including an improved fluid temperature control system.

It is another object of the present invention to provide a centrifuge apparatus in which the fluid being treated flows along lines which are in heat exchange relationship with a temperature control fluid, and in which the temperature of the sample is sensed to form a control signal which is employed to control the temperature of the rotor chamber.

It is a further object of the present invention to provide a continuous ultracentrifuge apparatus having improved means for controlling the rotor temperature and temperature of the feed and removal lines associated therewith.

It is a further object of the present invention to provide a continuous ultracentrifuge apparatus having improved means for controlling the temperature of the material to be centrifuged during its passage through the rotor, independent of the specific conditions prevailing during the centrifuging process, such as rotor speed, sample feed rate, etc.

These and other objects of the invention will become more clearly apparent from the following description when taken in conjunction with the accompanying drawing.

Referring to the drawing:

FIGURE 3 is a sectional view showing a sample feed and removal head including a fluid temperature sensing means;

FIGURE 4 is a view taken along the line 4—4 of FIGURE 3;

FIGURE 5 is a schematic circuit diagram showing a temperature controller associated with the sensing element associated with the sample feed and removal head;

Figure 1:
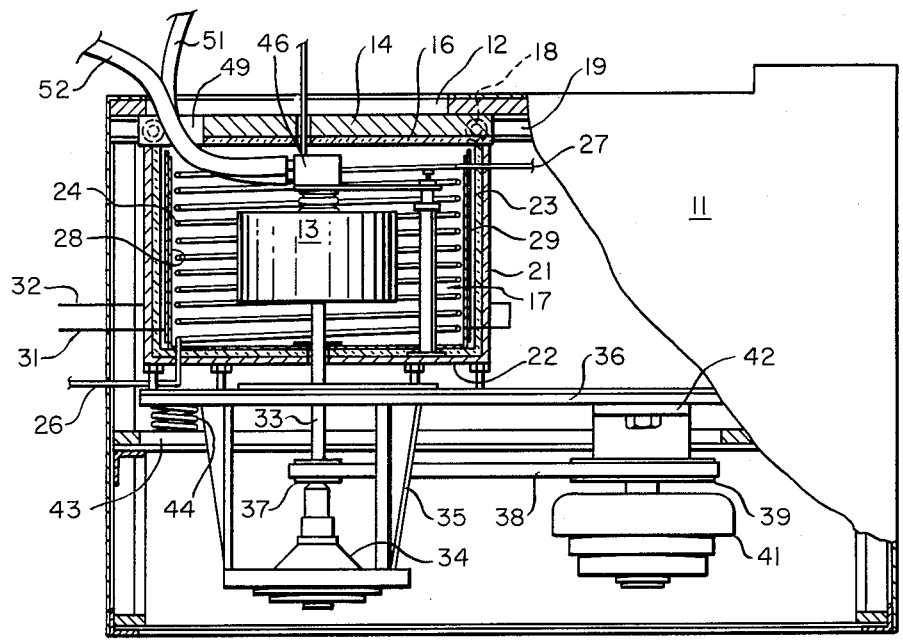
FIGURE 1 is a side elevational view, partly in section, showing continuous flow centrifuge apparatus incorporating the present invention.

The centrifuge apparatus illustrated in the figures, and particularly FIGURE 1, includes an outer housing 11 which encloses the working parts. The top of the housing is provided with an opening 12 through which the rotor 13 may be passed for mounting on the drive shaft, as will be presently described. A sliding door 14 serves to close the opening 12 and provide access to the rotor chamber 17. The door 14 is provided with spaced rollers 18 which ride in spaced channels 19 secured to the sides of the housing 11. A latch mechanism (not shown) works in conjunction with the controls (not shown) to releasably lock the door whereby it may be opened to install or remove a rotor from the chamber 17. The lower surface of the door carries insulation 16.

The side walls of the rotor chamber are formed by a cylindrical steel member 21 which acts as a guard in the event of breakage or explosion of the rotor under the strains occasioned at the relatively high operating speeds achieved thereby. The lower end of the member 21 receives the bottom wall 22, likewise made of relatively strong material. Thus, the side wall 21 and bottom wall 22 form a steel guard chamber. The interior of the guard chamber is provided with a layer of insulation 23 to minimize heat transfer. Refrigeration evaporator coils 24 are carried within the chamber and serve to refrigerate the interior of the chamber. The inlet and outlet connections for the coil are shown at 26 and 27. The coils may be wound in the form of a helix with the coil turns closely adjacent to the metal jacket 28 which is spaced from the walls of the chamber and carried by the bottom wall. A sheet heater 29 is wound around the cylindrical portion of the jacket 28. It includes terminals 31 and 32. The heater is adapted to be electrically energized and serves to supply heat to the interior of the chamber.

A suitable seal is formed between the jacket 28 and a spindle 33 which extends upwardly through the bottom 22 to support and rotate the rotor. Preferably, the spindle 33 is made of flexible material, and extends downwardly with its lower end journalled in an oil filled bearing assembly 34. The bearing assembly is supported by brackets 35 which extend downwardly from a resiliently mounted base 36. A driven pulley 37 is carried by the spindle 33 and is driven by a belt 38 which engages the drive pulley 39 of the motor 41. The motor is mounted by suitable brackets 42 to the base 36. For example, the base 36 may be supported on a platform 43 by spaced springs 44.

Figure 2:
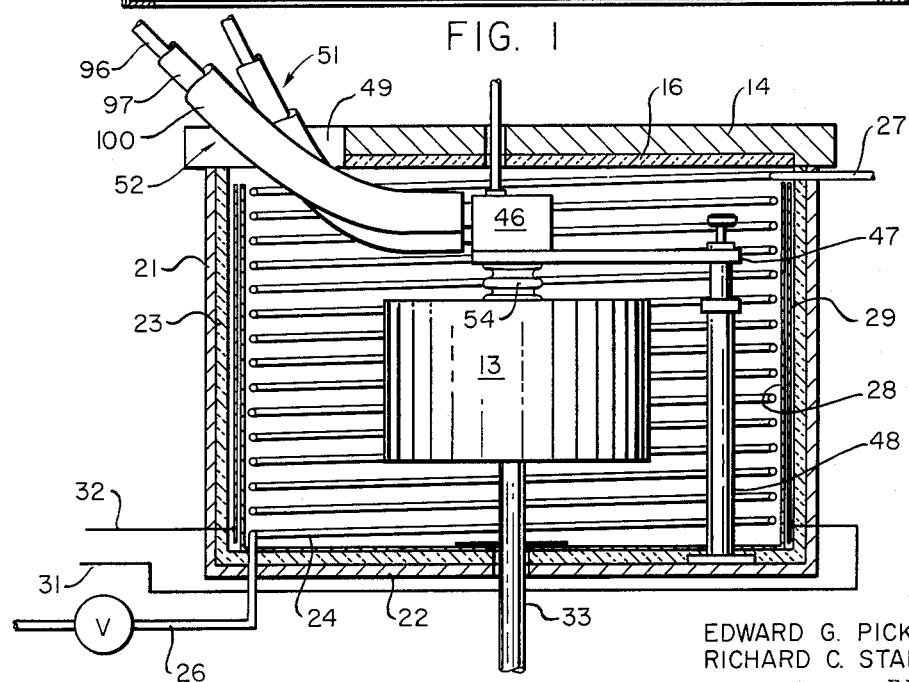
FIGURE 2 is an enlarged view of the rotor and rotor chamber shown in FIGURE 1.

Referring to FIGURE 2, a sample feed and removal assembly 46 is shown supported on an arm 47 mounted within the chamber on an adjustable post 48. A slot 49 may be formed in the front portion of the sliding door to accommodate the sample feed tube 51 and the sample removal tube 52 when the door is closed. A suitable seal 54 is formed between the sample feed and removal assembly and the upper surface of the rotor. A more detailed description of a rotor assembly is given in copending application, Serial No. 804,609, filed April 7, 1959, now Patent No. 3,073,517.

As seen in FIGURE 3, the rotor may include a bowl 56 having cylindrical sides 57 and an open top adapted to threadably receive a cover 58. The spaced recesses 59 are adapted to receive a spanner wrench for securing the cover to the bowl. The relatively large chamber defined by the bowl 56 and cover 58 receives a core 61 which occupies a large percentage of the volume of the chamber. The core is cylindrical in shape and its outer surface is spaced from the inner walls of the bowl to form a separating chamber. It may include spaced longitudinal grooves (not shown) on its surface.

The sample to be separated is fed through a fluid feed tube 71, down a central tube 72, into a feed chamber 63 where it flows downwardly near the axis of the rotor, outwardly along the bottom of the rotor in the space between the core 61 and rotor bottom, and upwardly in the separating chamber 62. The fluid then flows inwardly towards the center of the rotor and into the fluid removal chamber 64.

A suitable pump 65 is disposed within the chamber and is adapted to pump fluid from the chamber upwardly along the annular space 66 into the temperature sensing chamber 67 through the opening 68. The fluid then flows through the fluid removal tube 69.

A pump of the type shown at 65 is described in detail in said copending application. As is observed, the pump includes a pair of spaced plates 76 and 77, which are adapted to be immersed in the fluid being pumped. Assuming that the plates are stationary, the rotational velocity of the fluid between the plates is considerably less than the rotational velocity of the adjacent fluid. Thus, there will be a difference in centrifugal forces and a pressure head will be created which urges liquid radially inwardly between the plates and upwardly through the annular passage 66.

In certain instances, it is desirable to provide an inert atmosphere to the interior of the rotor and to the sample being separated. For this purpose, an opening 78 is provided in the sample feed and removal head 46, which opening extends downwardly and communicates with the interior of the rotor. A sleeve 79 is carried by the head 46 and is urged downwardly against the rotor by a spring 81. The lower surface 82 of the sleeve rides against the upper surface of a nut 83 and serves to provide a seal. If desired, a suitable diaphragm 54 may be provided to enclose the spring and sleeve. An inert atmosphere may be introduced through the opening 78 and the rotor maintained at a pressure slightly above that of the surrounds. Thus, gas continuously leaks out from any openings and prevents the entrance of air into the interior of the housing.

Generally, the fluid sample to be separated is stored in flasks and the like at a substantially constant predetermined temperature. As described above, for optimum separation, the temperature must be maintained during movement of the sample from the storage flasks into and through the rotor.

In accordance with the present invention, the temperature of the fluid itself is sensed just as it leaves the rotor by a temperature sensing element 91. This provides an accurate indication of the sample temperature within the rotor. This information is fed into a controller 92 (FIGURE 5) which, in turn, controls the ambient temperature within the rotor chamber 17 to control the temperature of the rotor and liquid sample flowing through the same so that the temperature of the sample is controlled during its transit through the rotor. The chamber temperature can be controlled by controlling the flow of refrigerant fluid in the coils 24 or by controlling the heater 29 in accordance with signals from the control network 92.

In general, the temperature of the rotor chamber as well as that of the rotor itself is held at a slightly lower value than the temperature at which the sample enters the rotor in order to offset any heating effects due to the mechanical action on the fluid and the frictional heating of the rotor.

The sensing element may, for example, comprise a thermocouple which provides an output voltage indicative of temperature or may comprise a temperature sensitive resistance element which is connected in a bridge circuit. Thus, it is seen that there is provided an improved feed head which includes temperature sensing means in cooperative relationship with the fluid leaving the rotor to thereby give an indication of the sample temperature for control purposes.

In operation, an electrical signal from the sensing element 91 (FIGURE 5) is fed to a control network 92 which, for example, may be of the duty cycle control type. The details of the control network constitute no part of this invention. That is, a controller in which the power supplied to the associate apparatus is of constant value. However, the power is pulsed with the duration of pulses varied so that average value of power is controlled. A suitable controller may, for example, be the Proportional Temperature Control, T-157, sold by Electronic Process Corporation of California. Pulsing control networks are well known in the heating art. The temperature within the rotor is then maintained constant. By application of current to the solenoid operated refrigerant valve, the control network can also control the flow cycle of the refrigerant to maintain the temperature within the rotor.

A major advantage with a system of this character is that the temperature of the sample fluid in the rotor is controlled. Any changes in the temperature of the sample fluid itself rather than changes in the rotor temperature control the temperature of the rotor. Thus, the temperature control is independent of thermal influences in the rotor. To minimize changes in temperature of the fluid as it travels between the storage location and the centrifuge, special feed and return lines are provided.

Referring to FIGURE 2, coaxial feed and return supply lines are employed in the fluid feed and fluid removal lines. The center tube 96 which, for example, is made of thermal insulating material, carries the fluid being processed. Another tube 97 surrounds the tube 96 and is spaced therefrom. The annulus formed between the center tube and the surrounding tube 97 receives a coolant. The coolant flows in the annulus of the feeder removal line, into the chamber 98 (FIGURES 3 and 4) formed in the fluid feed and removal assembly, and outwardly through the annulus in the removal or feed line as indicated by arrows 99. The coolant flowing in the annulus is at the same temperature within close limits as that desired for the fluid leaving the rotor chamber. By use of an insulating jacket 100, for example, a plastic foam jacket, and by maintaining a high flow rate of coolant, the temperature change in the coolant as it passes through the line is kept at a minimum. This provides a temperature environment for fluid tubes such that the tubes are maintained at substantially constant temperature. The effect of any change in the temperature of the coolant on the sample liquid will be substantially attenuated because of the thermal insulation of the tube 96. The heat exchange between the sample liquid and the coolant is determined by the temperature difference and the conductivity of the tube. The temperature difference is small, and if the tube is thermally insulating, the conductivity is low. Therefore, the heat exchange is minimum. It can be easily appreciated that without the coolant, the temperature difference between the fluid and the surrounds might be substantial with substantial changes in temperature of the sample.

Figure 6:
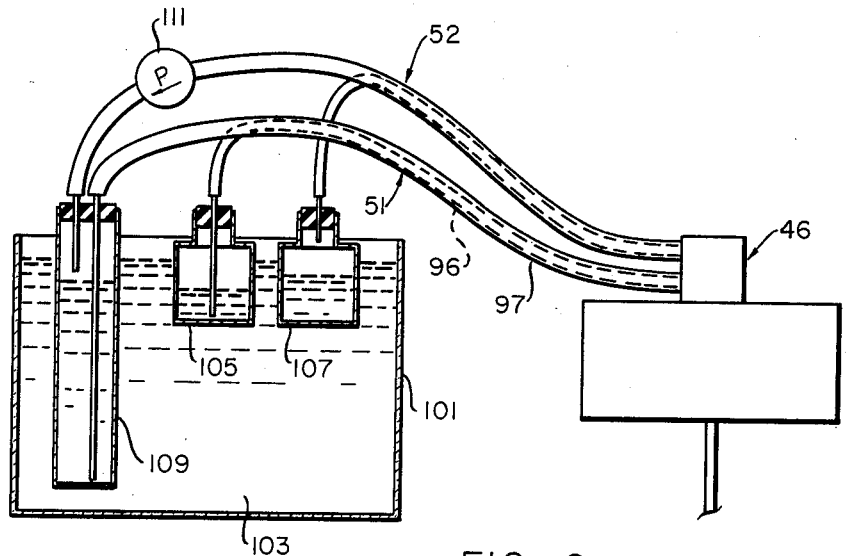
FIGURE 6 is a schematic view of a system in accordance with one embodiment of this invention.

Referring to FIGURE 6, a schematic view of an overall system in accordance with the invention is shown. A storage container 101 is provided with a bath 103 having a controlled temperature. The temperature of the bath may be controlled by conventional means in accordance with one embodiment of the invention. Smaller containers 105 and 107 which may be flasks or the like are, by any conventional means, disposed within the bath 103 to maintain proper temperature.

A sample to be centrifuged is placed in the flask 105 and the flask 107 is utilized to receive the sample after centrifugation. The container thus far described is similar to those used in the prior art for storing temperature sensitive materials.

Since the centrifuge may be located some distance from the storage container, and since the rate of sample flow may be quite low, means are included to maintain the sample at the desired temperature throughout its travel to the feed and removal head 46.

To this end, a third flask 109 is disposed within the bath 103. Moreover, the sample feed and removal tubes 51 and 52 are constructed in coaxial form having a center tube 96 (FIGURES 2, 4 and 6) which, for example, may be plastic. The center tube 96 carries the fluid being processed. Another tube 97 surrounds the tube 96 and is spaced therefrom to form an annulus therebetween. The annulus receives the temperature regulating fluid from the flask 109 which flows therethrough into the chamber 98 (FIGURES 3 and 4) formed in the fluid feed and removal assembly 46. From the chamber 98, the fluid flows through the annulus in the other lines 51 or 52 as indicated by the arrows 99 and is returned to the flask 109.

A pump 111 is employed to circulate the fluid from the flask 109 at a relatively high rate whereby the fluid flowing in the annulus of the lines 51 and 52 is at the same temperature, within close limits, as that of the sample in the flasks 105 and 107. By use of an insulating jacket 100, for example, a plastic foam jacket, the temperature change in the annulus of the lines 51 and 52 is kept at a minimum.

If the bath 103 and the centrifuge rotor are maintained at the same temperature, a temperature environment for the sample tubes 96 is provided such that the sample in the lines both before and after processing is the same.

Figure 7:
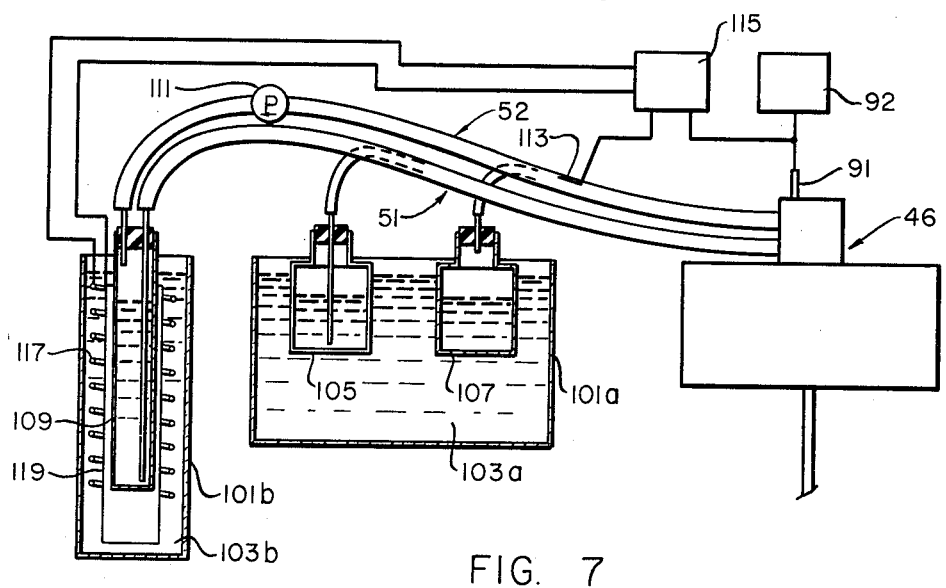
FIGURE 7 is a schematic view of a system in accordance with another embodiment of the invention.

A system in accordance with another embodiment of the invention is shown in FIGURE 7. The system is somewhat similar to that shown in FIGURE 6 but the flasks 105 and 107 are disposed in one bath 103a, while the flask 109 is disposed in another bath 103b. Here again, the temperature of the bath 103a is maintained by conventional method.

In this embodiment, a temperature sensitive unit 113 is placed in the annulus of one of the lines 51 or 52. The unit 113 may be of the type to provide an electrical output representative of temperature, such as a thermistor. The output of the unit 113 is compared by a comparator 115 with that of the unit 91. The comparator 115 may produce one output if the temperature in the annulus is greater than the temperature of the sample in the head 46, and a different output if the annulus temperature is less. These two outputs may be applied to cooling and heating units 117 and 119 respectively, associated with flask 109. Thus, the temperature of the fluid in the annulus may be controlled by the temperature of the sample leaving the head 46.

Alternatively, the baths 103a and 103b may be combined and the temperature of the stored sample may likewise be controlled. Thus, a single absolute temperature reading unit 91 and a comparative temperature unit 113 may cooperate to maintain the sample temperature constant throughout the system.

This application is a continuation-in-part of our copending application Serial No. 852,787, filed November 13, 1959, entitled "Continuous Flow Type Centrifuge and Fluid Temperature Control Therefor," (now abandoned).

We claim:

1. A continuous flow centrifuge system comprising a chamber, a centrifuge rotor disposed in said chamber, a stationary fluid feeding and removal assembly in fluid communication with the rotor for feeding a sample into the rotor and removing the sample therefrom, a fluid supply line in communication with the assembly for introducing the sample into the same, a fluid removal line in communication with the assembly for removing the sample from the same, hollow tube means surrounding said fluid supply and fluid removal lines and spaced therefrom to form an annular passage, a temperature regulating bath, a container of temperature regulating fluid disposed in said bath, a container of sample, means in communication with the container of sample and said fluid supply line for drawing the sample from said sample container into said fluid supply line for introduction into the assembly, means in communication with the annular passage and the container of temperature regulating fluid for driving said temperature regulating fluid into said annular passage, means disposed within said passage for developing a control signal representative of the temperature of the regulating fluid therein, and means connected to the control signal and responsive to the same for controlling the temperature of said bath.

2. A continuous flow centrifuge comprising a chamber, a centrifuge rotor disposed in said chamber, a stationary fluid removing and feeding assembly in fluid communication with the rotor for feeding a sample into the same and removing the centrifuged sample therefrom, a fluid supply line in fluid communication with the assembly for introducing the sample into the same, a fluid removal line in communication with the assembly for removing the centrifuged sample from the same, hollow tube means surrounding the entire fluid supply and fluid removal lines and spaced therefrom to form an annular passage, means connected to said passage for circulating a temperature regulating fluid through the annular passage to maintain the sample fluid flowing in the lines at a substantially constant predetermined temperature throughout the travel in the lines, and means disposed in said annular passage for developing a control signal representative of the temperature of the temperature regulating fluid therein, and means responsive to said control signal for controlling the temperature of the temperature regulating fluid.

3. A continuous flow centrifuge comprising a chamber, a centrifuge rotor disposed in said chamber, a stationary sample feeding and removal assembly in fluid communication with the rotor for feeding a sample into the same and removing the sample therefrom, a sample supply line in communication with the assembly for introducing the sample into the same, a sample removal line in communication with the assembly for removing the sample from the same, means disposed in said chamber for establishing the temperature of the same, temperature sensing means disposed in the sample in close proximity to the rotor to directly sense the temperature of the sample, said temperature sensing means forming a signal indicative of the temperature of the sample, control means connected to receive said signal and serving to control said temperature establishing means to thereby maintain a predetermined temperature in the chamber, hollow tube means surrounding said sample supply and sample removal lines and spaced therefrom to form an annular passage, and means for circulating a heat exchange fluid substantially at the desired sample temperature through said passage.

4. Apparatus as in claim 3 wherein said means for circulating heat exchange fluid comprises means for circulating the same at a flow rate which is relatively high in comparison to that of the sample fluid.

5. Apparatus as in claim 3 wherein said hollow tube means surrounding said sample supply and sample removal lines comprises a first hollow tube surrounding said sample supply line and a second hollow tube surrounding said sample removal line whereby a first portion of said annular passage is formed about said sample supply line and a second portion of said annular passage is formed about said sample removal line, said assembly including a chamber interconnecting said first and second portions of the annular passage.

References Cited in the file of this patent
UNITED STATES PATENTS

| | | |
|---|---|---|
| 1,464,707 | Hapgood | Aug. 14, 1923 |
| 1,800,306 | Loffler | Apr. 14, 1931 |
| 1,884,231 | Reeder | Oct. 25, 1932 |
| 1,981,089 | Carpenter | Nov. 20, 1934 |
| 2,144,229 | Ruda | Jan. 17, 1939 |
| 2,173,169 | Jenkins | Sept. 19, 1939 |
| 2,317,480 | Peters | Apr. 27, 1943 |
| 2,343,147 | Katsulos | Feb. 29, 1944 |
| 2,360,665 | Fields | Oct. 17, 1944 |
| 2,645,461 | Brown et al. | July 14, 1953 |
| 2,712,437 | Staebler | July 5, 1955 |
| 2,885,188 | Pickels et al. | May 5, 1959 |
| 2,912,556 | Hold | Nov. 10, 1959 |
| 2,983,488 | Thompson | May 9, 1961 |
| 3,073,517 | Pickels et al. | Jan. 15, 1963 |